US012128926B2

(12) United States Patent
Huang et al.

(10) Patent No.: US 12,128,926 B2
(45) Date of Patent: Oct. 29, 2024

(54) DEVICE AND VEHICLE FOR V2X SYSTEM (71) Applicant: HON HAI PRECISION INDUSTRY CO., LTD., New Taipei (TW)

(72) Inventors: Yu-Kai Huang, New Taipei (TW); Ke-Ping Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 225 days.

(21) Appl. No.: 17/806,938

(22) Filed: Jun. 14, 2022

(65) Prior Publication Data

US 2023/0174104 A1    Jun. 8, 2023

Related U.S. Application Data (60) Provisional application No. 63/265,292, filed on Dec. 13, 2021.

(30) Foreign Application Priority Data

Dec. 3, 2021 (TW) .................................. 110145347
May 6, 2022 (TW) .................................. 111117180

(51) Int. Cl.
  *B60W 60/00* (2020.01)
  *B60W 30/08* (2012.01)
  *H04W 4/40* (2018.01)
(52) U.S. Cl.
  CPC ........ *B60W 60/0015* (2020.02); *B60W 30/08* (2013.01); *H04W 4/40* (2018.02); *B60W 2555/20* (2020.02)
(58) Field of Classification Search
  CPC ............. B60W 60/0015; B60W 30/08; B60W 2555/20; H04W 4/40; H04W 40/246; H04W 40/20; H04W 84/18; H04L 47/283
  See application file for complete search history.

(56) References Cited

U.S. PATENT DOCUMENTS

2017/0018182 A1    1/2017 Makled et al.
2019/0088041 A1    3/2019 Lee et al.
                (Continued)

FOREIGN PATENT DOCUMENTS

CN      112911555 A      6/2021
CN      113748690 A     12/2021
                (Continued)

OTHER PUBLICATIONS

Hendrik-Joern Guenther et al., "Realizing collective perception in a vehicle", 2016 IEEE Vehicular Networking Conference (VNC), IEEE, Dec. 8, 2016, pp. 1-8.
                (Continued)

*Primary Examiner* — Alan D Hutchinson
(74) *Attorney, Agent, or Firm* — CKC & Partners.Co., LLC (57) ABSTRACT

A device, suitable for a V2X (Vehicle-to-everything) system, is disclosed. The device includes a wireless transceiver and a processor. The wireless transceiver is configured to receive a first collective perception message from a transmitting device of the V2X system. The first collective perception message comprises a first object age of a perceived object of the first collective perception message calculated by the transmitting device. The processor is coupled to the wireless transceiver, and the processor is configured to calculate a second object age of the perceived object of a second collective perception message. The second object age comprises a processing delay of the device and the first object age.

20 Claims, 4 Drawing Sheets

300

(56) References Cited

U.S. PATENT DOCUMENTS

| | | |
|---|---|---|
| 2019/0289459 A1 | 9/2019 | Shan |
| 2019/0394786 A1 | 12/2019 | Parron et al. |
| 2021/0004363 A1* | 1/2021 | Bailly ................... G06T 17/05 |
| 2021/0158701 A1 | 5/2021 | Cho et al. |

FOREIGN PATENT DOCUMENTS

| | | |
|---|---|---|
| IN | 111901752 A | 11/2020 |
| WO | 2017/045139 A1 | 3/2017 |

OTHER PUBLICATIONS

"Discussion and proposed Changes to TR 103 562 on CPS Use Cases", ETSI Draft; ITSWG1(18)000057, European Telecommunications Standards Institute (ETSI), vol. WG ITS WG1 Application Requirements and Services 10, Sep. 2018 (Sep. 10, 2018), pp. 1-65.
Takayuki Shimizu et al.,"Comparative Analysis of DSRC and LTE-V2X PC5 Mode 4 with SAE Congestion control", 2020 IEEE Vehicular Networking Conference (VNC), Dec. 16, 2020, pp. 1-8.

* cited by examiner

| collective perception message | header | ITS header |
| --- | --- | --- |
| | collective perception message information | originating station container |
| | | sensor information container |
| | | perceived object container |
| | | other containers |
| | | ECDSA signature |
| | | certificate for signature verification |
| | signature | |
| | certificate | |

Fig. 4

DEVICE AND VEHICLE FOR V2X SYSTEM

CROSS-REFERENCE TO RELATED APPLICATION

This application claims the priority benefit of Taiwan Application serial no. 110145347, filed Dec. 3, 2021, Taiwan Application serial no. 111117180, filed May 6, 2022, and the priority benefit of U.S. Application Ser. No. 63/265,292, filed Dec. 13, 2021, the full disclosure of which is incorporated herein by reference.

FIELD OF INVENTION

The invention relates to a device and a vehicle suitable for a V2X system. More particularly, the invention relates to a device and a vehicle suitable for a V2X system with a collective perception message.

BACKGROUND

One of the main challenges of highly autonomous driving is the vehicle's comprehensive cognition of the surrounding environment. A vehicle with a certain degree of autonomous driving requires sufficient knowledge of the surrounding environment to perform safe and comfortable automated operations. The current sensor system is limited to line-of-sight detections, which cannot meet the strict functional requirements of autonomous driving applications. V2X (Vehicle-to-everything) communication has become a potential technology to solve this problem, by allowing vehicles to share various information to improve the vehicle's environmental awareness and strengthen the vehicle's decision-making basis.

As an example of a V2X application, collective perception allows stations (vehicles and infrastructure) to notify connected stations of perceived objects (for example pedestrians, obstacles, and other vehicles) detected by their object tracking sensors. This enables the receiving vehicle to extend its environment model beyond the range of its own sensors. The object data is exchanged through collective perception message (CPM), which is currently being standardized by the European Telecommunications Standards Institute (ETSI) to ensure its interoperability among all communication standard-compliant vehicles.

Even though CPM greatly allows intelligent cognition of the environment, communication on urban street corners is still quite challenging due to the blocking of buildings. What's more, some infrastructure limitations of wireless communication hinder the possibility of transmitting emergency messages in remote areas. Therefore, if the received cognitive objects in the CPM are broadcasted again through the V2X sidelink, the cognitive range and the number of cognitive objects can be expanded.

In order to avoid the infinite flooding of old messages in V2X, the freshness of messages should be evaluated so that expired messages can expire, so it is necessary to obtain the age information of the object. However, time synchronization is a challenging task for V2X. Although the vehicle can perform a GNSS with high time accuracy, unstable weather conditions or road conditions can severely degrade synchronization accuracy.

At present, the current technology mostly uses the absolute value of the timestamp of the object information. However, this requires precise synchronization and takes into account the individual effects of time drift on transmitting and receiving sites. In practice, even a drift of only 100 ms in the timestamps in the collective perception message will greatly reduce the site's environment perception.

SUMMARY

An aspect of this disclosure is to provide a device, suitable for a V2X (Vehicle-to-everything) system. The device includes a wireless transceiver and a processor. The wireless transceiver is configured to receive a first collective perception message from a transmitting device of the V2X system. The first collective perception message includes a first object age of a perceived object of the first collective perception message calculated by the transmitting device. The processor is coupled to the wireless transceiver, and the processor is configured to calculate a second object age of the perceived object of a second collective perception message. The second object age includes a processing delay of the device and the first object age.

Another aspect of this disclosure is to provide a vehicle, suitable for a V2X system. The vehicle includes a sensor, a processor, and a wireless transceiver. The sensor is configured to sense an environment, so as to obtain a perceived object. The processor is coupled to the sensor, and the processor is configured to generate a collective perception message comprising the perceived object. The wireless transceiver is coupled to the processor, and the wireless transceiver is configured to transmit the collective perception message to several other vehicles surround the vehicle with a sidelink method. The collective perception message includes an object age of the perceived object.

Another aspect of this disclosure is to provide a device, suitable for a V2X system. The device includes a wireless transceiver and a processor. The wireless transceiver is configured to receive a first collective perception message from a transmitting device of the V2X system. The first collective perception message comprises a first object age of a perceived object of the first collective perception message calculated by the transmitting device. The processor is coupled to the wireless transceiver, and the processor is configured to calculate a second object age of the perceived object of a second collective perception message. The second object age includes a processing delay of the device and the first object age. When the first object age is larger than a first default value, the first collective perception message is discarded.

BRIEF DESCRIPTION OF THE DRAWINGS

Aspects of the present disclosure are best understood from the following detailed description when read with the accompanying figures. It is noted that, according to the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

In this document, the term "coupled" may also be termed as "electrically coupled", and the term "connected" may be termed as "electrically connected". "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Figure 1:
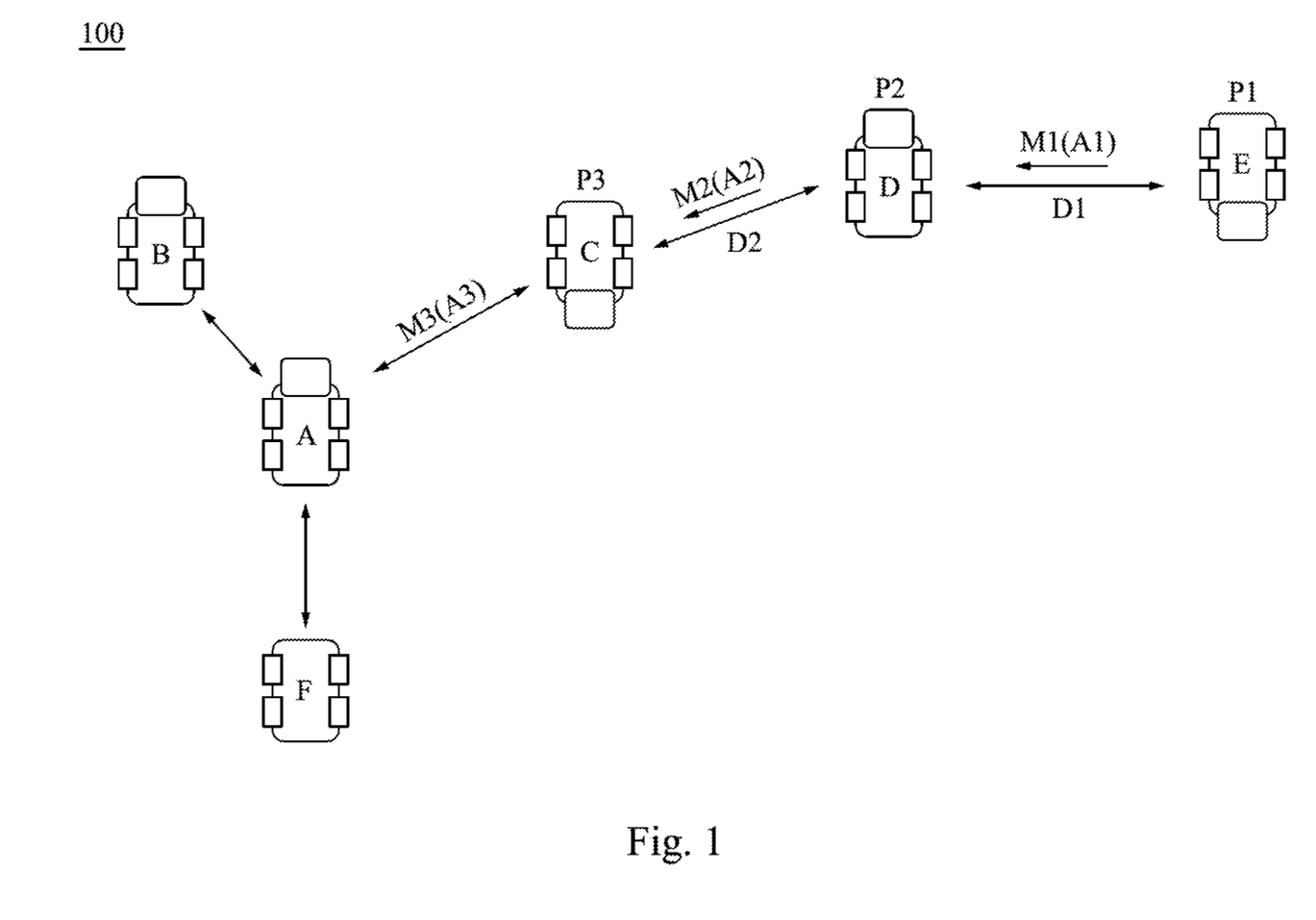
FIG. 1 is a schematic diagram of a V2X system according to some embodiments of the present disclosure.

Reference is made to FIG. 1. FIG. 1 is a schematic diagram of a V2X system 100 according to some embodiments of the present disclosure. As illustrated in FIG. 1, the V2X system 100 includes vehicles (devices) A, B, C, D, E, F. Vehicles can send or receive messages to each other through network communication. The detailed operation method of V2X system 100 will be described below with other figures. Furthermore, the number of vehicles in the V2X system 100 in FIG. 1 is for illustration only, and the embodiments of the present disclosure are not limited thereto. Furthermore, each of the vehicles A, B, C, D, E, F can also be a mobile station or a RSU or any other device in V2X wireless communication system. In some embodiments, each of the vehicles (devices) A, B, C, D, E, F includes a vehicle name or a device name. In some embodiments, the vehicles B, C, D, E, F are the several devices surround the vehicle A which can receive a collective perception message from the vehicle A. In some other embodiments, the vehicles B, C, F nearest to the vehicle A are the several devices surround the vehicle A which can receive a collective perception message from the vehicle A. In some other embodiments, vehicle D is one of the several devices surround the vehicle E (a transmitting device transmitting a first collective perception message) and the vehicle D receives the first collective perception message from the vehicle E; and the vehicle C (a receiving device receiving a second collective perception message) is one of the several devices surround the vehicle D and the vehicle D transmits the second collective perception message to the vehicle C according to the received first collective perception message from vehicle E (in other words, vehicle C receives the second collective perception message from vehicle D). In some other embodiments, vehicle E transmits a first collective perception message to several devices, including the vehicle D, surround the vehicle E; and each of the several devices, including the vehicle D, surround the vehicle E transmits a second collective perception message according to the received first collective perception message from the vehicle E to several devices, including the vehicle C, surround the vehicle D.

Figure 2:
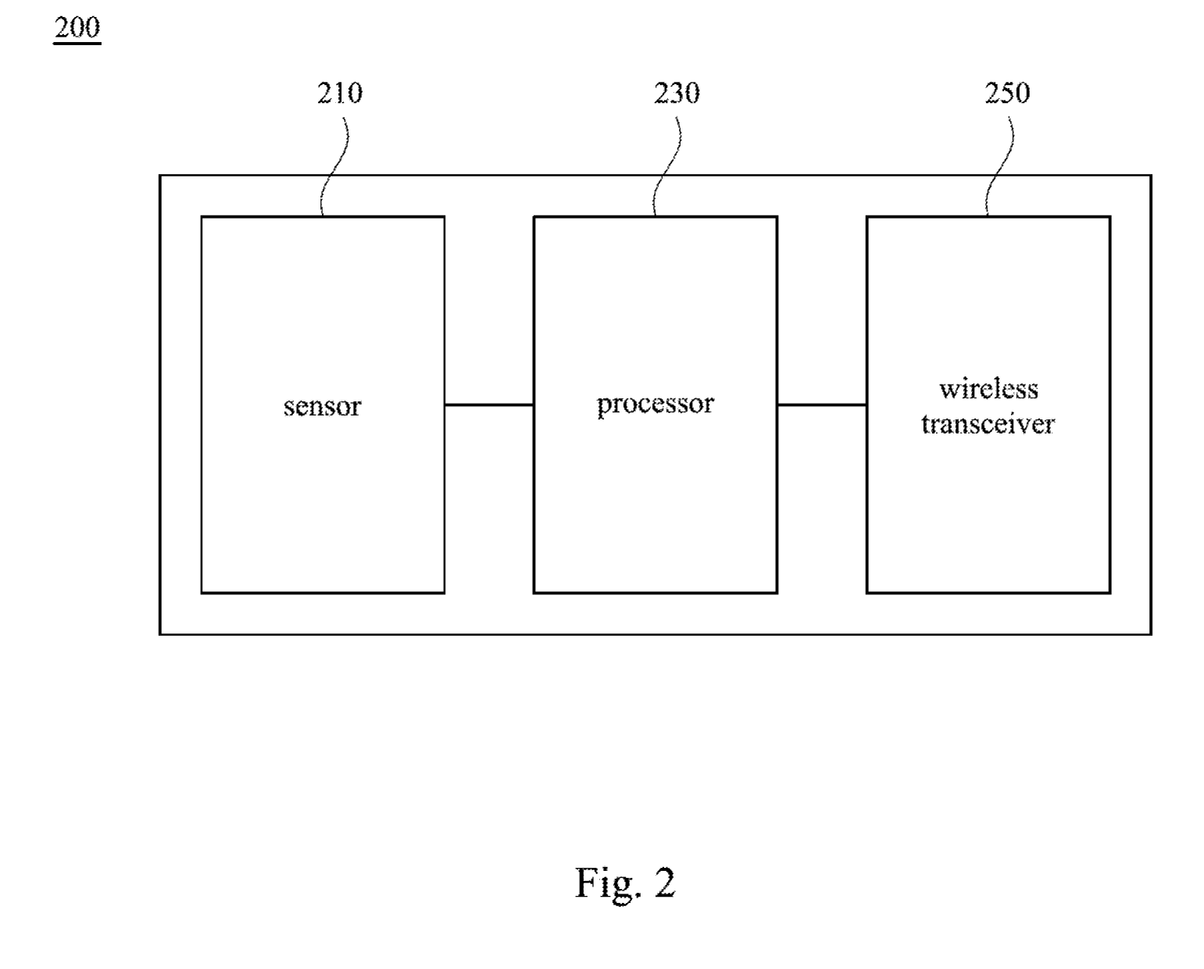
FIG. 2 is a schematic diagram of a vehicle according to some embodiments of the present disclosure.

Reference is made to FIG. 2. FIG. 2 is a schematic diagram of a vehicle 200 according to some embodiments of the present disclosure. The vehicle 200 shown in FIG. 2 can be configured to represent the vehicles A, B, C, D, E, F in FIG. 1.

As illustrated in FIG. 2. The vehicle 200 includes a sensor 210, a processor 230 and a wireless transceiver 250. In the connection relationship, the sensor 210 is coupled to the processor 230, the processor 230 is further coupled to the wireless transceiver 250. The detailed operation method of the vehicle 200 will be described below with other figures. Furthermore, the vehicle 200 as illustrated in FIG. 2 is for illustrative purposes only, and the embodiments of the present disclosure are not limited thereto.

Figure 3:
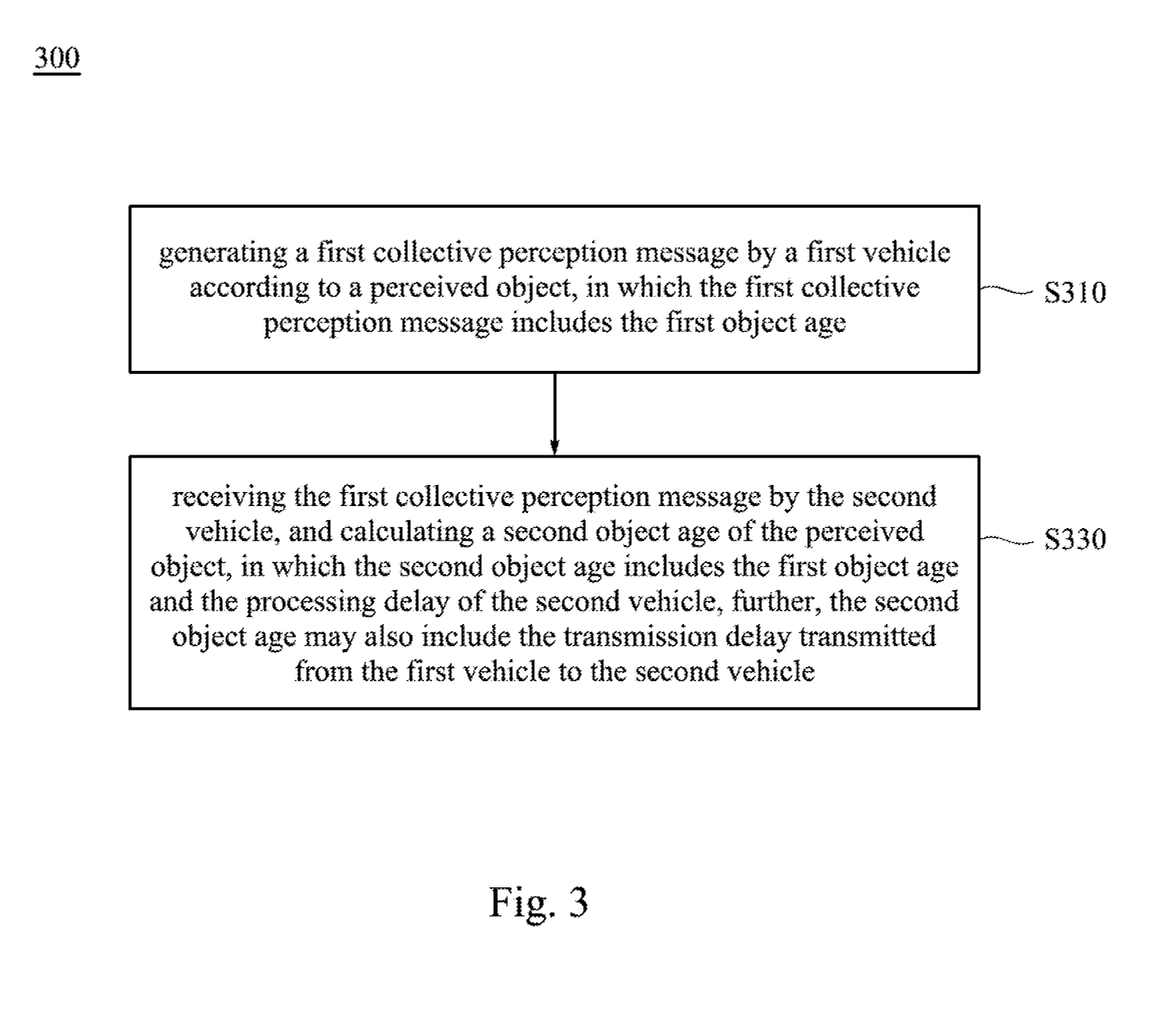
FIG. 3 is a flow chart of an information transmission method according to some embodiments of the present disclosure.

Reference is made to FIG. 3. FIG. 3 is a flow chart of an information transmission method 300 according to some embodiments of the present disclosure. The embodiments of the present disclosure are not limited thereto.

It should be noted that, the information transmission method 300 can be applied to a system with the same or similar structure as the V2X 100 in FIG. 1 or a device with the same or similar structure as the vehicle 200 in FIG. 2. In order to make the description simple, the following will take FIG. 1 and FIG. 2 as examples to describe the operation method, however, the embodiments of the present disclosure are not limited thereto.

It should be noted that, in some embodiments, the information transmission method 300 can also be implemented as a computer program and stored in a non-transitory computer-readable medium, And make the computer, electronic device, or the aforementioned processor 230 in FIG. 2 read the recording medium and execute the operation method. The processor 230 may include one or more wafers. The non-transitory computer-readable recording medium may be read-only memory, flash memory, floppy disk, hard disk, compact disc, pen drive, magnetic tape, a database accessible over a network, or a non-transitory computer-readable recording media with the same function that a person skilled in the art can easily think of.

In addition, it should be understood that the operations of the information transmission method 300 mentioned in this embodiment, unless the sequence is specifically stated, can be adjusted according to actual needs, and even can be simultaneously or partially simultaneously implemented. Furthermore, in different embodiments, these operations can also be adaptively added, replaced, and/or omitted.

Reference is made to FIG. 3. The information transmission method 300 includes operations S310 and S330.

In operation S310, a first collective perception message is generated by a first vehicle according to a perceived object, in which the first collective perception message includes the first object age. Reference is made to FIG. 2 together, in some embodiments, the operation S310 can be performed by the processor 230 as shown in FIG. 2.

In operation S330, the first collective perception message is received by the second vehicle, and a second object age of the perceived object is calculated, in which the second object age includes the first object age and the processing delay of the second vehicle, further, the second object age may also include the transmission delay transmitted from the first vehicle to the second vehicle. Reference is made to FIG. 2 together, in some embodiments, operation S330 can be performed by the processor 230 as shown in FIG. 2.

Reference is made to FIG. 1 together. For example, the information transmission method 300 includes the vehicle E sensing the environment to obtain information of perceived objects (such as pedestrians) in the environment. Next, after the vehicle E generates the collective perception message according to the perceived object, it transmits the collective perception message to the vehicle D.

Figure 4:
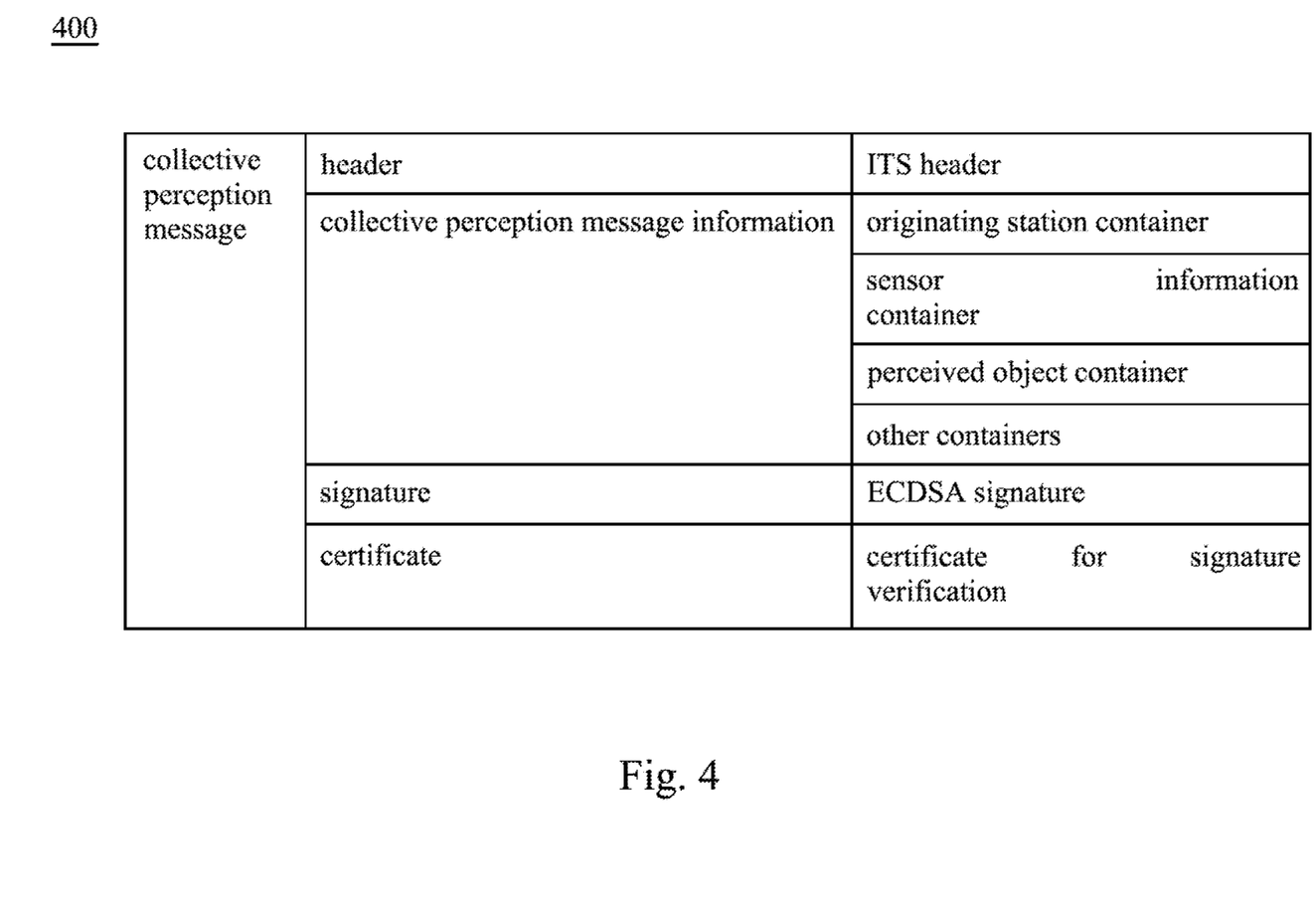
FIG. 4 is a schematic diagram of a collective perception message according to some embodiments of the present disclosure.

In order to make the collective perception message easy to understand, reference is made to FIG. 4. FIG. 4 is a schematic diagram of a collective perception message 400 according to some embodiments of the present disclosure. As illustrated in FIG. 4, the collective perception message 400 includes the header, the collective perception message information, the signature, the certificate, etc. In detail, the collective perception message information further includes the originating station container, the sensor information container, the perceived object container, and other container, etc. It should be noted that, In FIG. 1, for ease of understanding, the collective perception message 400 described in FIG. 4 will be described with the labels M1 and M2 as its codes.

Reference is made to FIG. 1 and FIG. 4, when the vehicle E senses the environment to obtain the measurement information of a perceived object, the vehicle E generates a collective perception message M1 accordingly. The sensor information container of the collective perception message M1 includes an originating station ID to include the device name of vehicle E. Here the device name of the vehicle E can be regarded as an originating device name.

In some embodiments, the originating station ID refers to the ID of the vehicle where the sensor that detected the perceived object is located. Since the information of the perceived objects (such as pedestrians) in the collective perception message M1 is sensed by the vehicle E, the originating station ID includes the device name of the vehicle E, and the name of the vehicle E can be reagarded as the originating device name.

Since the sensor information container in the collective perception message includes the originating station ID, the information can be prevented from being transmitted back to the originating station. For example, in some embodiments, when the vehicle is transmitting the collective perception messages to another vehicle in the V2X system, the vehicle avoids transmitting the messages to the originating station ID vehicle. In this way, the situation of the collective perception messages being repeatedly sent back to the originating vehicle is avoided. Or, when a vehicle receives a collective perception message from another vehicle in the V2X system, if the originating station ID in the collective perception message is the same as the vehicle ID, the vehicle avoids receiving the collective perception message or discards the received collective perception message. In this way, the situation of the collective perception messages being repeatedly sent back to the originating vehicle is avoided.

In some embodiments, the perceived object container further includes the object age of the perceived object. For example, the object age A1 of the perceived object of the collective perception message M1 generated by the vehicle E includes the processing delay P1 of the vehicle E. The processing delay P1 of the vehicle E refers to the time difference between the time that the vehicle E senses the perceived object and the time that the vehicle E transmits the collective perception message M1.

In some embodiments, if the information of perceived object (such as pedestrian) in the collective perception message M1 is sensed by the vehicle E, the object age A1 of the perceived object of the collective perception message M1 generated by the vehicle E can be the processing delay P1 of the vehicle E, or zero, or blank.

In some embodiments, the sensor information container includes the location information when the vehicle E transmits the collective perception message M1, or the location information when the vehicle E obtains the measurement information of the perceived object, or any location information during the period between the vehicle E obtaining the measurement information of the perceived object and transmitting the collective perception message M1. In some embodiments, the location information is the coordinate information obtained by the vehicle E through GPS satellites and/or the wireless communication networks such as 5G.

After the vehicle D receives the collective perception message M1, the vehicle D calculates the object age A2 of the perceived object of the collective perception message M2 according to the collective perception message M1.

In some embodiments, the object age A2 is the object age A1 plus the processing delay P2 of the vehicle D. In other words, the object age A2 is the processing delay P1 of the vehicle E plus the processing delay P2 of the vehicle D.

In some embodiments, the vehicle D can then use the distance between the location information of the collective perception message M1 sent by the vehicle E and the location information when the vehicle D receives the collective perception message M1, so as to calculate the transmission delay D1 of the vehicle E transmitting the collective perception message M1 to the vehicle D. Accordingly, the vehicle D calculates the object age A2 of the perceived object of the collective perception message M2 as the object age A1, plus the transmission delay D1, and then plus the processing delay P2. In other words, the object age A2 is the processing delay P1 of the vehicle E, plus the transmission delay D1 of the vehicle E transmitting to the vehicle D, and then plus the processing delay P2 of the vehicle D.

In some embodiments, since the transmission delay D1 from the vehicle E to the vehicle D is much smaller than the processing delay P2 of the vehicle D or the processing delay P1 of the vehicle E, therefore, the vehicle D does not count the transmission delay D1 into the calculation of the object age A2 of the perceived object of the collective perception message M2.

In the embodiments, when calculating the object age of the perceived object, the transmission delay is calculated according to the distance between the vehicles, and the processing delay is calculated by the vehicle itself according to the message processing time of the vehicle itself. Compared with the practice of synchronizing the time of the transmitting vehicle and the receiving vehicle separately and then obtaining the time stamp difference between the two vehicles, the embodiments of the present disclosure solves the problem of inaccurate time synchronization between different vehicles.

In some embodiments, the vehicle D generates the collective perception message M2 according to the perceived object information of the collective perception message M1 and transmits the collective perception message M2 to the vehicle C.

Since the measurement information of the perceived object is obtained by the vehicle E sensing the environment, the originating station ID in the sensor information container in the collective perception message M2 includes the device name of the vehicle E.

In some embodiments, the perceived object container in the collective perception message M2 includes the object age A2 of the perceived object. For example, the object age A1 of the perceived object of the collective perception message M1 generated by the vehicle E includes the processing delay P1 of the vehicle E. The processing delay P1 of the vehicle E refers to the time difference between when the vehicle E senses the perceived object and when the vehicle E transmits the collective perception message M1. The vehicle D generates the collective perception message M2 according to the collective perception message M1, and the perceived object container in collective perception message M2 includes the object age A2 of the perceived object. In some embodiments, the object age A2 is equal to the object age A1 (also P1) plus the processing delay P2, that is, P1+P2. In some embodiments, the object age A2 is equal to the object age A1 (also P1) plus D1 and then the processing delay P2, which is P1+D1+P2.

In some embodiments, the sensor information container includes the location information when the vehicle D transmits the collective perception message M2, or the location information when the vehicle D receives the collective perception message M1, or any location information during the period between the vehicle D receiving the collective perception message M1 and the vehicle D transmitting the collective perception message M2. In some embodiments, the location information is the coordinate information obtained by the vehicle D through the GPS satellites and/or the wireless communication networks such as 5G.

According to the distance between the location information in the collective perception message M2 and the location information when the vehicle C receives the collective perception message M2, the vehicle C calculates that the transmission delay from the vehicle D transmitting the collective perception message M2 to the vehicle C is D2.

In some embodiments, the vehicle C calculates the object age A3 of the perceived object of the collective perception message M3 as the object age A2 plus the processing delay P3 of vehicle C In other words, the object age A3 is the processing delay P1 of the vehicle E, plus the processing delay P2 of the vehicle D, plus the processing delay P3 of the vehicle C.

In some embodiments, the object age A3 is the object age A2 plus the processing delay P3 of the vehicle C, plus the transmission delay D2 of the vehicle D to the vehicle C. In other words, the object age A3 is the processing delay P1 of the vehicle E plus the transmission delay D1 of the transmission from the vehicle E to the vehicle D, plus the processing delay P2 of the vehicle D, plus the transmission delay D2 of the transmission from the vehicle D to the vehicle C, and plus the processing delay P3 of the vehicle C.

By analogy, the remaining vehicles calculates the latest object age of the perceived object according to the transmission delay of the transmission path before receiving the collective perception message and the processing delay of each vehicle.

In some embodiments, when the vehicle D receives the collective perception message M1 and obtains the object age A1 of the perceived object, if the object age A1 is larger than the first default value, the vehicle D discards the collective perception message M1, and will not transmit the perceived object in this message to other vehicles. If the vehicle D determines that the object age A1 is not larger than a first default value, the vehicle D will continue to send the perceived object in the message to other vehicles. In this way, the infinite flood of old messages in the V2X system can be avoided.

In some embodiments, when vehicle D is generating the collective perception message M2 and calculating object age A2 of the perceived object, if object age A2 is larger than a second default value, the vehicle D will not generate or will discard collective perception message M2, and will not transmit the perceived objects in this message to other vehicles. If the vehicle D determines that the object age A2 is not larger than a second default value, the vehicle D will continue to send the perceived object in the message to other vehicles. In this way, the infinite flood of old messages in the V2X system can be avoided. In some embodiments, the first default value is different from the second default value. In some embodiments, the first default value is the same as the second default value.

Reference is made to FIG. 2 again. In some embodiments, the sensor 210 can be a circuit or other element with an environment sensing function. In some embodiments, the processor 230 can be a server, a circuit, a central processing unit (CPU), a micro-decoder (MCU) or other equivalent devices with functions such as temporary storage, operation, data reading, receiving signals or messages, transmitting signals or messages or equivalent functions. In some embodiments, the wireless transceiver 250 can be an arithmetic circuit or element with data reading, transmission and reception, or similar functions.

According to the embodiment of the present disclosure, it is understood that the embodiment of the present disclosure is to provide an information transmission method, a V2X system and a vehicle, the calculation of the object age of the perceived object are based on the transmission delay and/or the processing delay, which solves the problem of inaccurate time synchronization between different vehicles. Furthermore, since the originating station container in the collective perception message includes the information of the vehicle, the repeated transmission of the message back to the originating vehicle can be avoided.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A device, suitable for a V2X(Vehicle-to-everything) system, comprising:
   a wireless transceiver, configured to receive a first collective perception message from a transmitting device of the V2X system, wherein the first collective perception message comprises a first object age of a perceived object of the first collective perception message calculated by the transmitting device; and
   a processor, coupled to the wireless transceiver, and configured to calculate a second object age of the perceived object of a second collective perception message, wherein the second object age comprises a processing delay of the device and the first object age.

2. The device of claim 1, wherein a plurality of devices, including the device, surround the transmitting device, receive the first collective perception message from the transmitting device with a sidelink method.

3. The device of claim 1, wherein the processor is further configured to calculate a first transmission delay according to a location information of the transmitting device of the first collective perception message and a location information of the device, wherein the second object age further comprises the first transmission delay.

4. The device of claim 1, wherein the processor is further configured to generate the second collective perception message according to the first collective perception message, the device further transmits the second collective perception message to a plurality of devices, including a receiving device, surround the device with a sidelink method.

5. The device of claim 4, wherein the receiving device calculates a third object age of the perceived object of a third collective perception message, wherein the third object age comprises a processing delay of the receiving device and the second object age.

6. The device of claim 5, wherein the receiving device is further configured to calculate a second transmission delay according to a location information of the device of the second collective perception message and a location information of the receiving device, wherein the third object age further comprises the second transmission delay.

7. The device of claim 1, wherein the first collective perception message comprises a sensor information container, the sensor information container comprises an originating device name of an originating device which generates the perceived object.

8. The device of claim 7, wherein when a device name of the device and the originating device name of the originating device of the perceived object are the same, the device does not receive the first collective perception message or discards the first collective perception message received.

9. The device of claim 1, wherein the device is a vehicle, a mobile station, or a RSU.

10. A vehicle, suitable for a V2X system, comprising:
a sensor, configured to sense an environment, so as to obtain a perceived object;
a processor, coupled to the sensor, and the processor is configured to generate a collective perception message comprising the perceived object; and
a wireless transceiver, coupled to the processor, and the wireless transceiver is configured to transmit the collective perception message to a plurality of other vehicles surround the vehicle with a sidelink method;
wherein the collective perception message comprises an object age of the perceived object, wherein the object age is a processing delay of the vehicle.

11. The vehicle of claim 10, wherein the object age is zero or blank.

12. The vehicle of claim 10, wherein the collective perception message comprises a sensor information container, the sensor information container comprises an originating device name of an originating device which generates the perceived object.

13. The vehicle of claim 12, wherein the originating device name of the originating device of the sensor information container comprises a vehicle name of the vehicle.

14. A device, suitable for a V2X system, comprising:
a wireless transceiver, configured to receive a first collective perception message from a transmitting device of the V2X system, wherein the first collective perception message comprises a first object age of a perceived object of the first collective perception message calculated by the transmitting device; and
a processor, coupled to the wireless transceiver, and the processor is configured to calculate a second object age of the perceived object of a second collective perception message, wherein the second object age comprises a processing delay of the device and the first object age;
wherein when the first object age is larger than a first default value, the first collective perception message is discarded.

15. The device of claim 14, wherein when the second object age is larger than a second default value, the second collective perception message is discarded.

16. The device of claim 14, wherein the processor is further configured to calculate a first transmission delay according to a location information of the transmitting device of the first collective perception message and a location information of the device, wherein the second object age further comprises the first transmission delay.

17. The device of claim 14, wherein the first collective perception message comprises a sensor information container, the sensor information container comprises an originating device name of an originating device which generates the perceived object.

18. The device of claim 17, wherein when a device name of the device and the originating device name of the originating device of the perceived object are the same, the device does not receive the first collective perception message or discards the first collective perception message received.

19. The device of claim 14, wherein when the first object age is not larger than the first default value, the processor is configured to generate the second collective perception message according to the first collective perception message.

20. The device of claim 14, wherein when the second object age is not larger than a second default value, the processor transmits the second collective perception message to a plurality of other devices surround the device with a sidelink method;
wherein when the second object age is larger than the second default value, the second collective perception message is discarded.

* * * * *